(12) United States Patent
Abari et al.

(10) Patent No.: US 10,175,340 B1
(45) Date of Patent: Jan. 8, 2019

(54) SWITCHING BETWEEN OBJECT DETECTION AND DATA TRANSFER WITH A VEHICLE RADAR

(71) Applicant: Lyft, Inc., San Francisco, CA (US)

(72) Inventors: Farzad Cyrus Foroughi Abari, San Bruno, CA (US); Romain Clément, Campbell, CA (US); Helen Ruth Lurie, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 15/965,796

(22) Filed: Apr. 27, 2018

(51) Int. Cl.
| | | |
|---|---|---|
| *G01S 7/00* | (2006.01) | |
| *G05D 1/02* | (2006.01) | |
| *G06K 9/00* | (2006.01) | |
| *G06T 7/70* | (2017.01) | |
| *G01S 13/02* | (2006.01) | |
| *G01S 13/86* | (2006.01) | |
| *G01S 13/93* | (2006.01) | |

(52) U.S. Cl.
CPC ............ *G01S 7/006* (2013.01); *G01S 13/931* (2013.01); *G06K 9/00805* (2013.01); *G01S 13/86* (2013.01); *G01S 2013/0254* (2013.01); *G05D 1/028* (2013.01); *G05D 1/0257* (2013.01); *G05D 2201/0213* (2013.01); *G06T 7/70* (2017.01); *G06T 2207/10028* (2013.01); *G06T 2207/10044* (2013.01); *G06T 2207/30242* (2013.01); *G06T 2207/30252* (2013.01)

(58) Field of Classification Search
CPC .... G01S 13/74; G01S 13/781; G01S 13/9303; G01S 7/006; G01S 13/765; G01S 13/825; G01S 13/86; G01S 13/931
See application file for complete search history.

(56) References Cited

U.S. PATENT DOCUMENTS

| | | | | |
|---|---|---|---|---|
| 5,847,661 A | * | 12/1998 | Ricci | G01S 13/931 340/902 |
| 5,867,535 A | * | 2/1999 | Phillips | G01S 1/04 375/295 |
| 2004/0215373 A1 | * | 10/2004 | Won | G08G 1/161 701/1 |
| 2007/0200741 A1 | * | 8/2007 | Hunter | H04B 1/0007 341/126 |
| 2016/0054441 A1 | * | 2/2016 | Kuo | G01S 13/931 342/73 |
| 2016/0320482 A1 | * | 11/2016 | Ling | G01S 13/931 |
| 2017/0120868 A1 | * | 5/2017 | Watanabe | B60R 25/245 |
| 2017/0277960 A1 | * | 9/2017 | Ramasamy | G05D 1/0088 |
| 2018/0038953 A1 | * | 2/2018 | Choi | G01S 13/931 |
| 2018/0059239 A1 | * | 3/2018 | Batra | G01S 13/91 |
| 2018/0128898 A1 | * | 5/2018 | Seler | G01S 7/006 |

* cited by examiner

*Primary Examiner* — Peter M Bythrow
(74) *Attorney, Agent, or Firm* — Baker Botts L.L.P.

(57) ABSTRACT

In one embodiment, a method includes accessing an operational status of a vehicle that is coupled to a radar antenna array, accessing sensor data that includes a count of and a location of a plurality of objects within a vicinity of the vehicle, accessing signal strength data associated with one or more base station antennas located within the vicinity of the vehicle, and determining to switch at least some of a plurality of radar resources of the radar antenna array from an object detection mode to a data transfer mode. The determination is based on the operational status, the sensor data, or the signal strength data.

33 Claims, 10 Drawing Sheets

SWITCHING BETWEEN OBJECT DETECTION AND DATA TRANSFER WITH A VEHICLE RADAR

BACKGROUND

Vehicles used for transporting people or goods may be equipped with one or more radar antennas to detect and estimate the shape of objects near the vehicle. A radar antenna signal typically consists of a main lobe that projects out of the antenna and into the space in front of the antenna. The radar antennas may be phased array antennas. The vehicle may be able to steer the beam generated by the phased array antenna using a phase shifter to generate constructive interference in many different directions. As the vehicle moves through the environment, the vehicle may gather information through the radar antenna and other sensors, such as imaging data, information about riders, and information about its own vitals. Currently this information is generally transmitted to a server in large batches while the vehicle is not in operation. This is both inefficient and untimely, as it is desirable to transmit urgent data as soon as possible once it is gathered.

DESCRIPTION OF EXAMPLE EMBODIMENTS

Figure 1A:
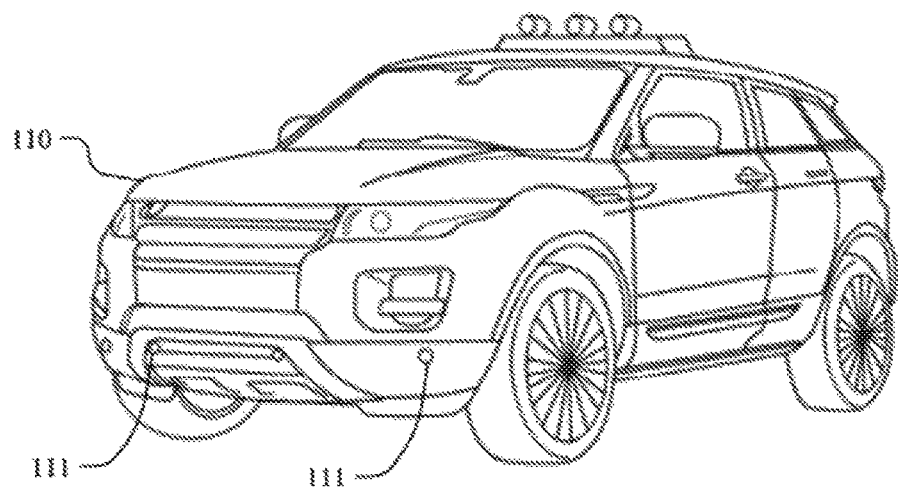
FIGS. 1A and 1B illustrate an example vehicle with example radar antennas.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim or in any combination with any embodiment or feature described or depicted herein or with any of the features of the attached claims.

A vehicle may operate in an environment where several base station antennas are installed throughout the infrastructure of the environment. As an example and not by way of limitation, the base station antennas may be installed on buildings, traffic signals, in the roadway, on utility boxes, stop signs, or in any other suitable location. The base station antennas may be radar antennas, similar to or the same as the automotive imaging radars that are installed on the vehicle (e.g., an autonomous vehicle). The base station antennas and the vehicle radar antennas may make up at least some of a wireless millimeter-wave communication network. The wireless millimeter-wave communication network may operate at any suitable frequency range (e.g., 60 GHz, 75 GHz). As an example and not by way of limitation the wireless millimeter-wave communication network may operate between 77 and 81 GHz. As the vehicle moves through the environment, it may gather information such as imaging data of the LIDAR sensors, information about riders, information about its own vitals like battery life, tire pressure, and the operational status of various sensing components, or any other suitable information. Currently this information is generally transmitted to a server in large batches while the vehicle is not in operation. For example, all the information gathered by the sensing components may be offloaded in one batch at the end of each day. This is both inefficient and untimely, as it is desirable to transmit urgent data as soon as possible once it is gathered. For example, it may be desirable to transmit traffic data in real time using a wireless millimeter-wave communication network instead of a cellular data connection. Although this disclosure describes and illustrates radar antennas for use on autonomous vehicles, this disclosure contemplates that the radar antennas discussed herein may also be used on non-autonomous vehicles (e.g., manually driven vehicles), where appropriate.

This disclosure contemplates at least two different methods for transmitting data through the wireless millimeter-wave communication network at opportune times while the car is in operation. These two methods are (1) switching the vehicle radar antenna between an object detection mode and a data transfer mode, and (2) simultaneously performing object detection and data transfer with radar chirps. If the radar antenna uses the first method, it may need to determine whether it is safe to switch at least some of its signaling resources from object detection mode to data transmission mode. This is because while the radar antenna is transmitting data, it may be unable to also detect objects. The antenna's first priority may be to detect objects to help the vehicle avoid collisions. Thus, only when not all of its signaling resources are necessary for object detection will the radar antenna switch to data transmission mode.

Figure 1B:
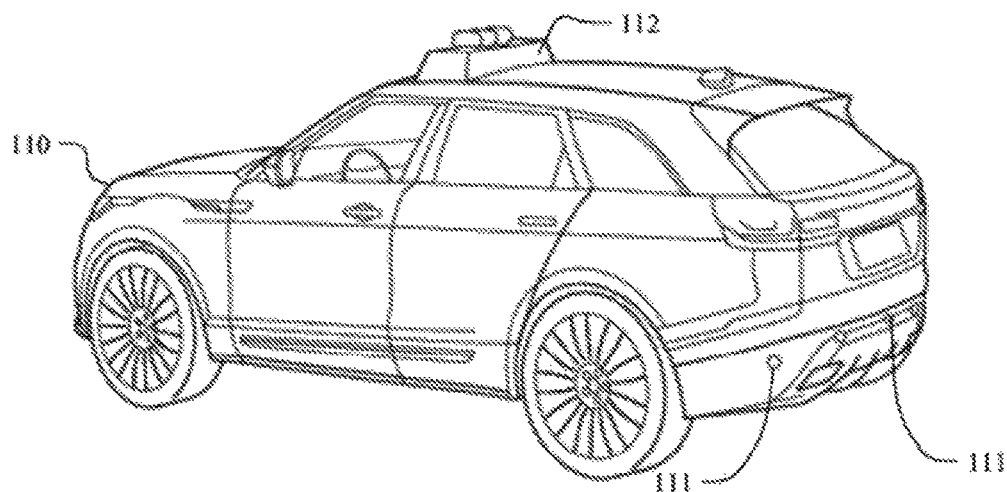

FIGS. 1A and 1B illustrate an example vehicle 110 with example radar antennas 111. Vehicle 110 may be a manually driven vehicle or it may be an autonomous vehicle (AV). In particular embodiments, radar antenna 111 may be a radar antenna array that includes multiple antennas. Each antenna in the antenna array may be capable of steering a radar signal in multiple different directions. In particular embodiments, radar antenna 111 may be a phased array antenna which may be able to steer its transmission signal with traditional beamforming techniques. Radar antenna 111 may be configured to detect the presence and location of any number of any type of object within the environment, including people, traffic signals, animals, other vehicles, bicycles, buildings, curb sides, mailboxes, or any other object. As an example and not by way of limitation, the radar antenna 111 may emit a radar signal that is reflected off people 120 back to a receiver associated with the radar antenna 111. The radar antenna 111 may also be configured to transmit data to base station 230 by modulating the phase, amplitude, or frequency of the emitted signal. In particular embodiments, vehicle 110 may also include one or more other types of sensing devices 112 (e.g., a LIDAR sensor).

Figure 2:
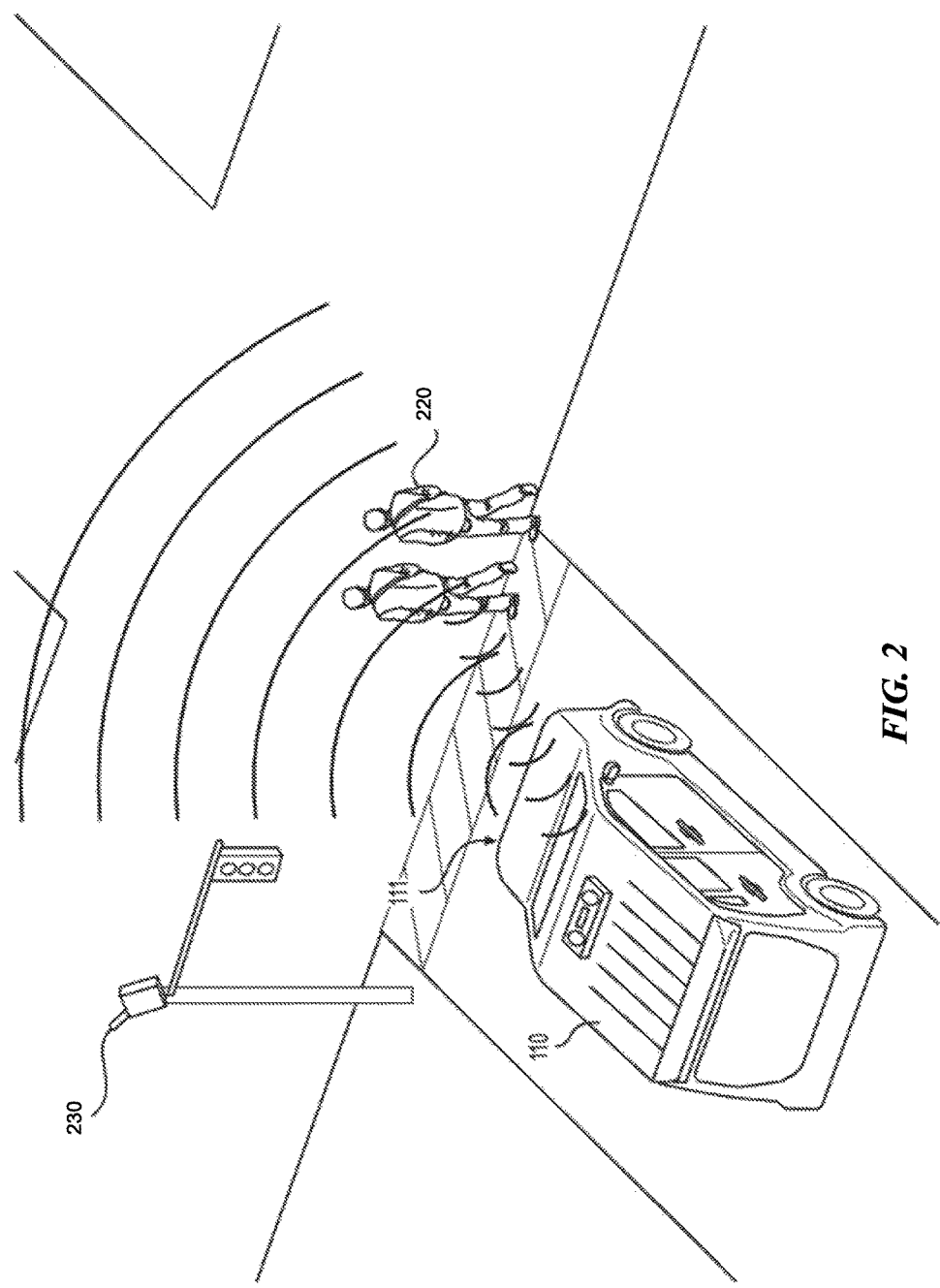
FIG. 2 illustrates an example vehicle with example radar antenna that is emitting an example radar signal.

FIG. 2 illustrates an example vehicle 110 with example radar antenna 111 that is emitting an example radar signal. The environment depicted by FIG. 2 may be any suitable urban, suburban, or rural environment. The environment may be equipped with several base station antennas 230. Although only one base station antenna 230 is depicted in FIG. 2, this disclosure contemplates any number of base station antennas 230 installed in any suitable location in the environment. The base station antenna 230 may be radar antennas or another suitable antenna capable of receiving and transmitting data via a wireless millimeter-wave communication network. The environment may also include one or more objects, including people 220.

In particular embodiments, radar antenna 111 may be a radar antenna array that includes multiple subantenna antennas. Each subantenna array in the antenna array may be capable of steering a radar signal in multiple different directions. In particular embodiments, radar antenna 111 may be a phased array antenna which may be able to steer its transmission signal with traditional beamforming techniques. Radar antenna 111 may be configured to detect the presence and location of any number of any type of object within the environment, including people, traffic signals, animals, other vehicles, bicycles, buildings, curb sides, mailboxes, or any other object. As an example and not by way of limitation, the radar antenna 111 may emit a radar signal that is reflected off people 120 back to a receiver associated with the radar antenna 111. The radar antenna 111 may also be configured to transmit data to base station 230 by modulating the phase, amplitude, or frequency of the emitted signal.

The base station antenna 230 may be configured to receive a modulated signal and either decode the signal itself or relay the signal to another computing device that may then decode the signal into useful information. The data transmitted by the signal emitted from radar 111 may include information about the vehicle (e.g., speed, location, or system diagnostics such as battery life and tire pressure), information about the vehicle's surroundings (e.g., imaging data, a list of objects around the vehicle, traffic information), or other suitable information. The base station antenna 230 may likewise be able to transmit information to the vehicle via the radar antenna 111. The information transmitted from the base station antenna 230 to the vehicle may include information about nearby vehicles, traffic information about areas up ahead on the vehicle's driving route, instructions from a main network controller, or any other suitable type of information. One additional type of information may be entertainment data for riders of the vehicle. For example, the base station antenna 230 may be able to transmit a stream of video content to client devices associated with either the rider or the vehicle. Other data of this nature may include the emails or social media content associated with a particular rider.

In particular embodiments, the data that is sent via radar antenna 111 to base station antenna 230 may be prioritized according to a prioritization policy set by a management system associated with vehicle 110. The prioritization policy may indicate which data types should be transmitted first. In many cases, vehicle 110 may only have a few moments (e.g., seconds or minutes) to transmit data to the network. For example, if the vehicle is stopped at a stop light, radar antenna 111 may establish a wireless connection with a nearby base station antenna and begin transmitting. But once vehicle 110 begins driving again, all or some of the antenna radar 111 resources may need to be used for object detection; thus, not all of the data may be offloaded during the red light traffic stop. Therefore, it may be desirable to transfer the most important or urgent data first, so that the most important or urgent data is more likely to be communicated to the management system. The data may be prioritized as follows. First, radar antenna 111 may transmit vehicle vitals that are critical to the safety of the rider or surrounding pedestrians, riders or drivers. Such information may include information about the operability of the sensors. If a sensor is not performing optimally, but the vehicle is still safe to operate, it may still be urgent and important to transmit data about the under-performing sensor. The information may also include data about the vehicle's vitals, such as battery life, tire pressure, accidents, engine diagnostics, and other information pertinent to the vehicle's operability. Second, radar antenna 111 may transmit the data that the sensors have gathered during normal operation of the vehicle. This data may include imaging data gathered by LIDAR sensors, lists and locations of objects surrounding the vehicle 110, images captured by an optical camera, or any other information that describes or characterizes the environment. Third, radar antenna 111 may transmit data that a rider wishes to send, such as emails, social media content, text messages, and the like. In particular embodiments, there may also be a download prioritization policy that specifies what information the computing devices associated with the vehicle may download and in what order. As an example and not by way of limitation, the download policy may specify that urgent or important information be downloaded first, such as the location of objects in the road (if necessary), alternate routes, upcoming road hazards, and the like. Second, information that the rider may want during a ride may be downloaded, such as emails, texts, social media, and streaming video content.

Figure 3:
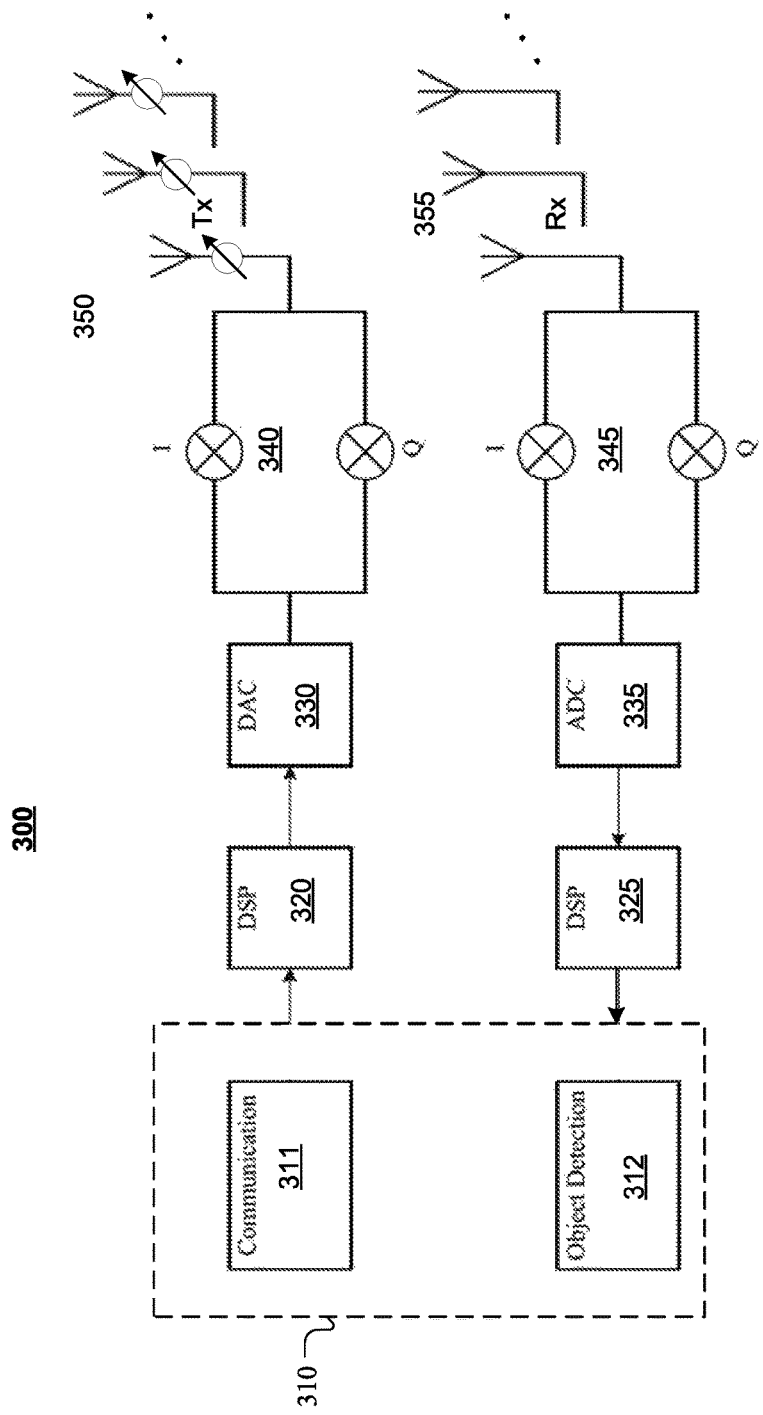
FIG. 3 illustrates an example radar antenna schematic.

FIG. 3 illustrates an example radar antenna 300. Radar antenna 300 may illustrate the components of radar antenna 111 and optionally of base station antenna 230. Radar antenna 300 may include a computing module 310 that include a communication module 311 and an object detection module 312, digital signal processing units 320 and 325, a digital to analog converter 330 and analog to digital converter 335, an IQ modulator 340 (and optionally a second IQ module 345) for modulating the amplitude or phase of the signal, transmit antenna array 350 (which may include phase shifters) and receive antenna array 355. In particular embodiments, the communication module 311 may receive instructions to generate data communications for the radar antenna to transmit out into the environment. Object detection module 312 may be used primarily when the radar antenna is in object detection mode, and may serve to process the radar data to detect objects surrounding the vehicle 110. In particular embodiments, communication module 311 may be responsible for determining when it is safe to switch from object detection mode to data transfer mode. The process by which this determination is made is discussed below with reference to FIG. 8.

Figure 4:
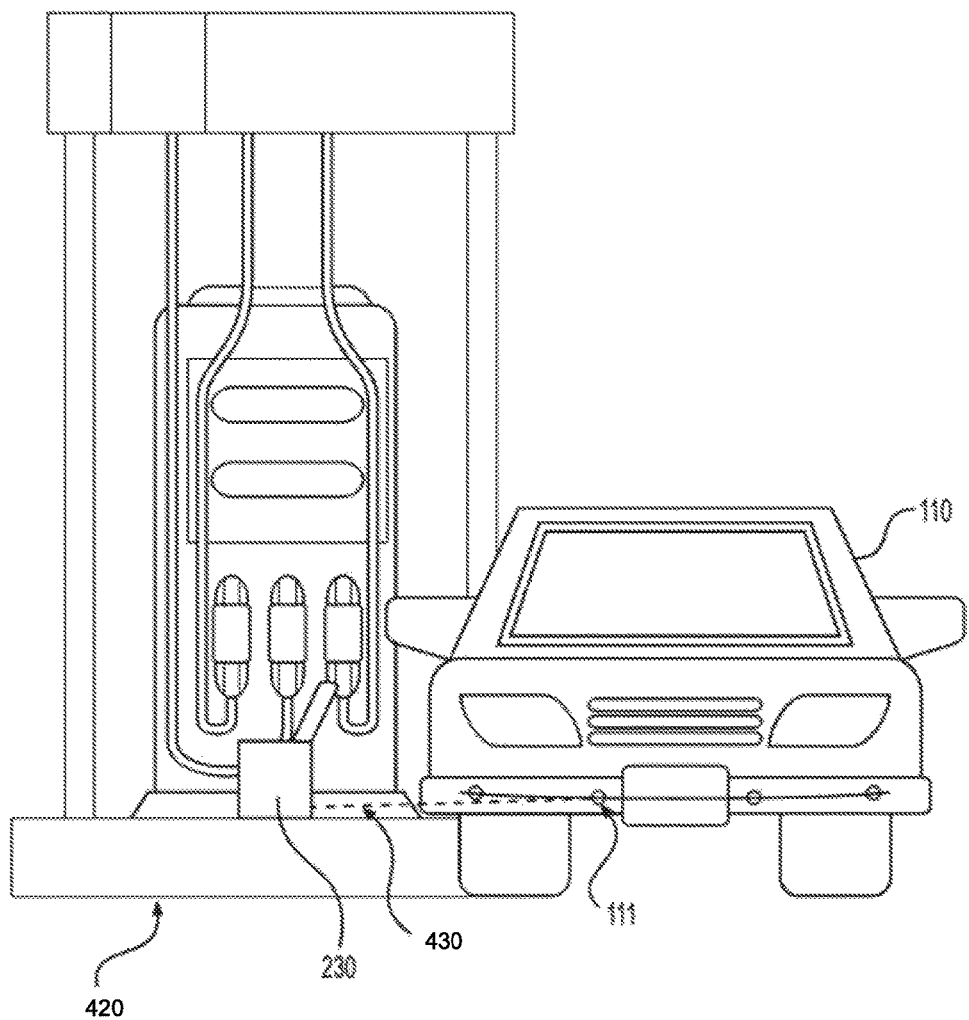
FIG. 4 illustrates an example vehicle at an example service station.

FIG. 4 illustrates an example vehicle 110 at an example service station 420. The vehicle 110 may periodically need to pause its driving to receive a variety of services, including charging its battery, receiving routine automotive maintenance, or calibrating or repairing its sensors and antennas. A stop at a service station may last anywhere from a few minutes to an hour or more. While the vehicle 110 is stopped, the radar antenna 111 may not need to devote all (or any) of its resources to object detection. This is because the vehicle 110 is not at risk of colliding with any objects while it is stopped. Thus, the radar antenna 111 may be able to safely switch from object detection mode to data transmission mode while it is being serviced at service station 420. The radar antenna 111, vehicle 110, or another computing device associated with these may make this determination in at least two different ways. The first may be a virtual geographic boundary using GPS, RFID, radar, or another suitable mechanism. Such a geofencing technique may be a straightforward solution. When the vehicle 110 crosses the virtual geographic boundary, it may receive a signal indicating that is within a transmission boundary. The virtual geographic boundary may surround at least part of the service station, for example the area that the vehicle 110 must part while it is being serviced. Once the vehicle 110 or radar antenna 111 detects that it is within the virtual boundary, it may automatically switch to data transmission mode and begin transmitting data via link 430. Another way to determine whether to switch may be to monitor the status of the car and when the car is stopped, switch to data transmission mode. This is explained in more detail with reference to FIG. 8 below.

Figure 5:
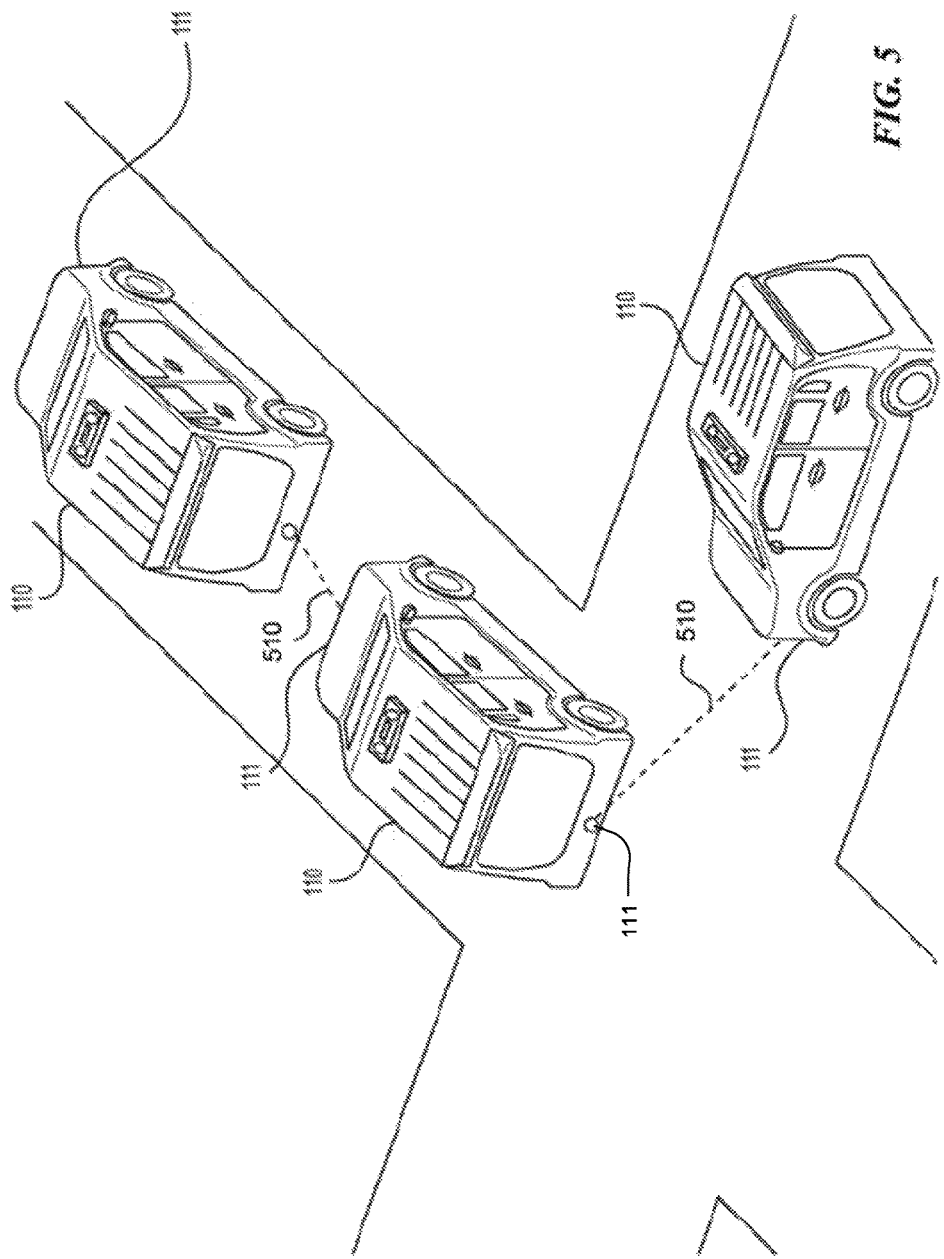
FIG. 5 illustrates example communication links between multiple example vehicles.

FIG. 5 illustrates example communication links between multiple example vehicles. In particular embodiments, it may be desirable for multiple vehicles 110 to communicate with each other via communication links 510. Communication links 510 may operate in the wireless millimeter-wave communication network. Such communication may be necessary to alert other vehicles of accidents, upcoming traffic signals, upcoming traffic blockages, alternate routes, or other useful information. For example, the information contained in a communication link 510 may include the locations of the closest N objects to the vehicle, where N is a positive whole number, along with the location of each object, either in relation to the vehicle transmitting the data or as an absolute location (e.g., as GPS coordinates). Communication between vehicles 110 may be accomplished in several ways; one of the ways may be with radar antenna 111. Radar antenna 111 may need to steer its beam to maintain a communication session with another radar antenna 111. As an example and not by way of limitation, a first radar antenna 111 on a first vehicle 110 may be transmitting data to a second radar antenna 111 on a second vehicle 110. During data transmission, the second vehicle 110 may turn right at a street corner, as illustrated in FIG. 5. To continue transmitting, the first radar antenna 111 may need to beamform its signal to the right to follow the second radar antenna 111. The two radar antennas 111 may continue communicating until the distance between them becomes too great or the signal strength becomes too small to maintain a wireless connection. In particular embodiments, radar antenna 111 may be configured to transmit data only to those other radar antennas 111 that are positioned substantially in front of or behind the vehicle 110. This may be useful for saving signaling resources for the vehicles that are traveling along the same path at the vehicle 110, as those vehicles are likely more interested in traffic data and objects along the path than are vehicles that are driving on a different path. As an example and not by way of limitation, a first radar antenna of a first vehicle may communicate with a second radar antenna of a second vehicle only while the second vehicle is driving in front of the first vehicle. When either vehicle turns or otherwise moves away from the other vehicle, the communication session may end.

Figure 6:
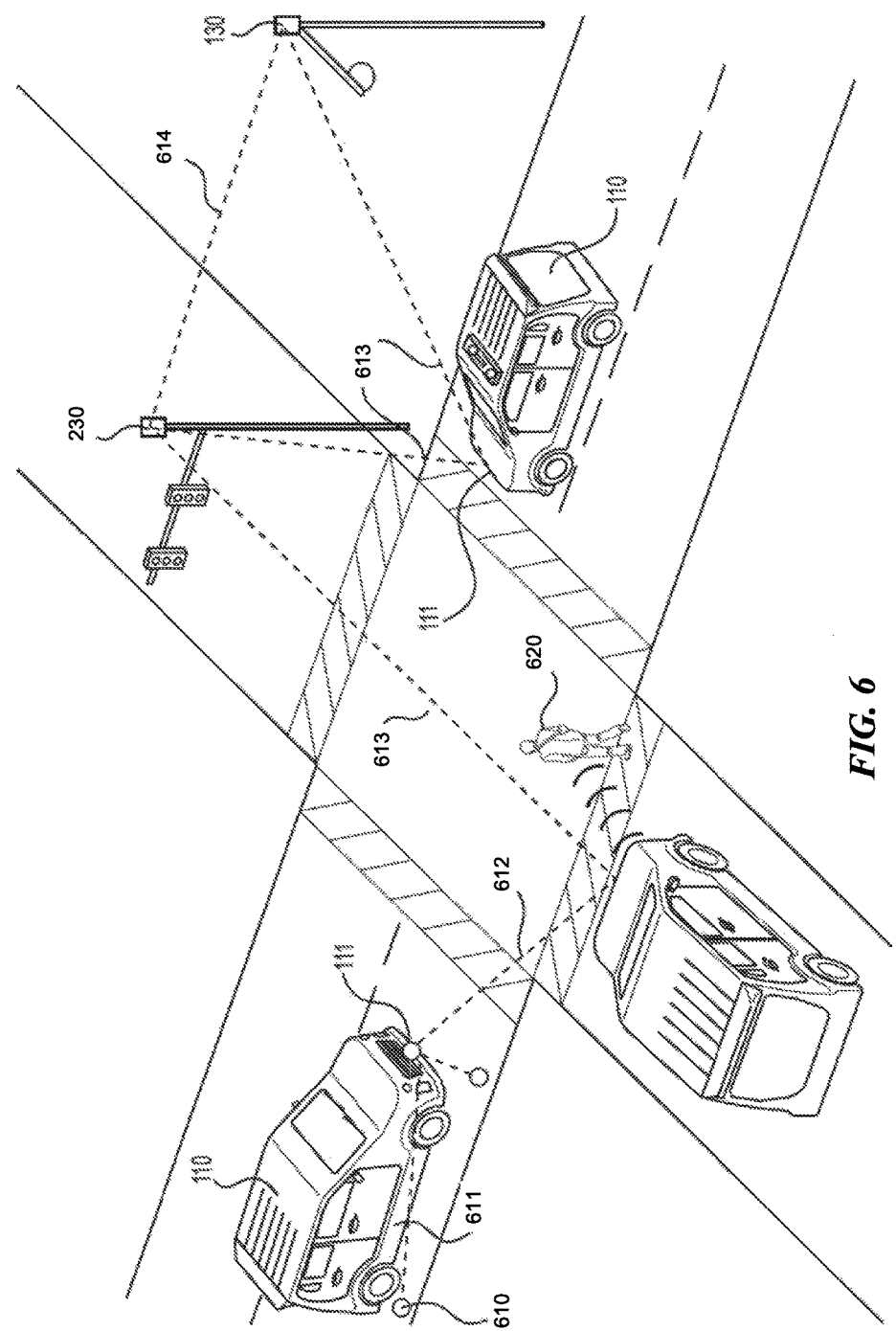
FIG. 6 illustrates example vehicles interfacing with example base station antennas.
Figure 7:
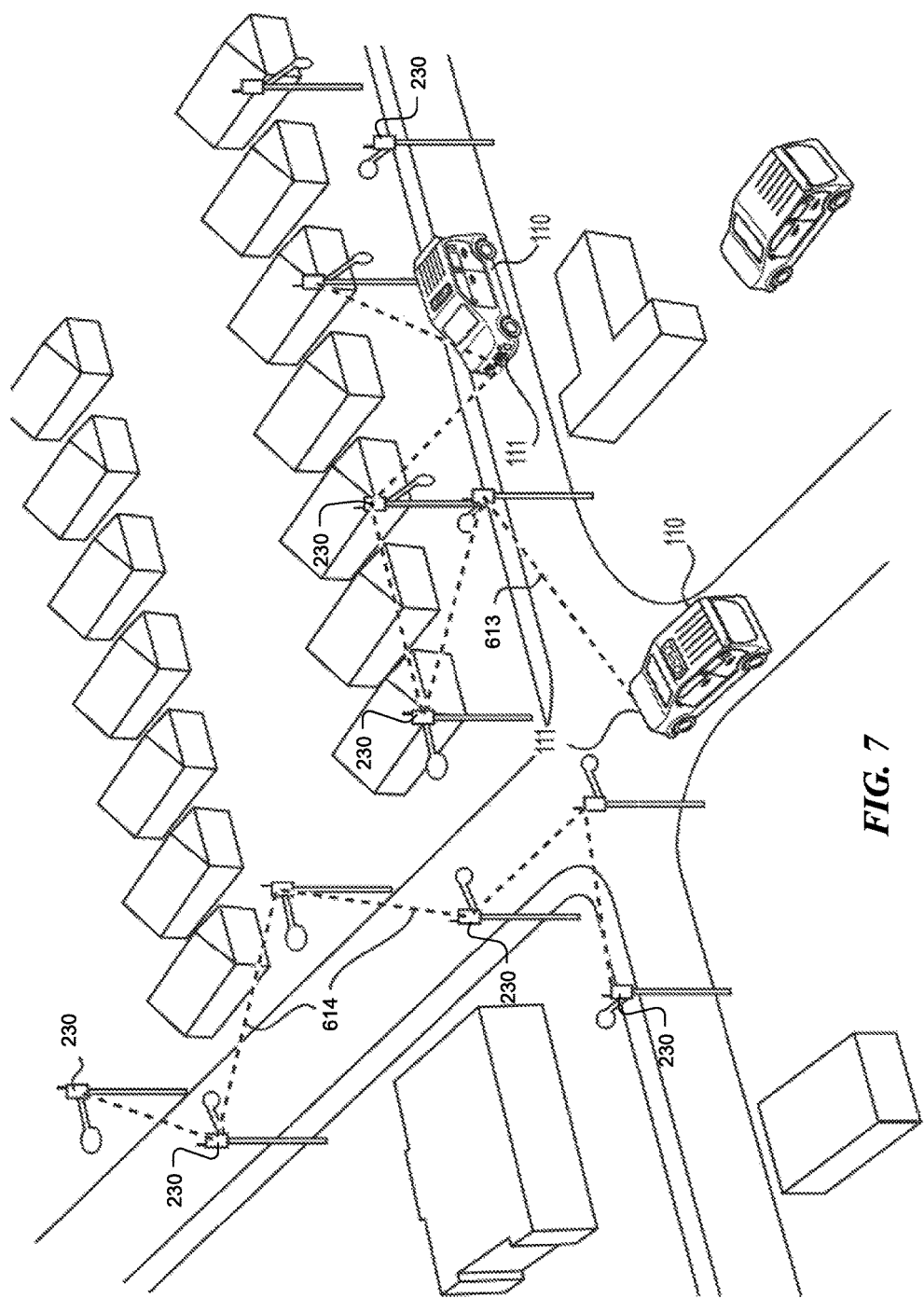
FIG. 7 illustrates an example infrastructure network of example base station and radar antennas.

FIGS. 6 and 7 illustrate example vehicles interfacing with example base station antennas in an infrastructure network environment. The environment in FIG. 6 includes vehicles 110 with radar antennas 111 installed on the front bumper of the vehicle, pedestrian 620, base station antennas 230 installed on utility poles, and base station antennas 610 installed in or on the ground of the environment. In particular embodiments, radar antenna 111 may be able to beamform multiple antenna signals in multiple different directions. Radar antenna 111 may be an antenna array that includes multiple antennas that generate multiple signals, and each signal may be steered in a different direction. Thus, radar antenna 111 may divert some of its signaling to object detection and some of its signaling to data communication. As an example and not by way of limitation, vehicle 110 at the bottom of FIG. 6 illustrates a radar antenna 111 that is simultaneously detecting pedestrian 620, communicating with base station antenna 230, and communicating with another radar antenna 111. Base station antenna 610 may operate similarly to base station antenna 230, it may merely be located in the ground instead of on street structures. FIG. 7 illustrates an example infrastructure network of example base station antennas. An infrastructure network may enable fast communication between vehicles 110, a management system associated with the vehicle, riders of the vehicle, or any combination thereof. An infrastructure network may be created when base station antennas 230, 610 communicate with antenna radars 111 via links 613 and when base station antennas 230, 610 communicate with each other via links 614.

If the radar antenna 111 is moving relative to the base station antenna 230, the radar antenna 111 may need to beamform to maintain a connection with the base station antenna 230. As an example and not by way of limitation, radar antenna 111 of vehicle 110 may have established a wireless connection with a base station 230 that is located on a street corner. During the communication session, vehicle 110 may turn right on the street corner. To maintain the communication session and transmit more data, radar antenna 111 may beamform its signal (e.g., via phased array beam steering) to the right such that it maintains a maximum signal-to-noise ratio (SNR) with the base station 230 and remains directed at the base station 230. In particular embodiments, the radar antenna 111 need not maintain the communication channel through beamforming. Beamforming may help maintain a maximum SNR, which may facilitate data throughput. The radar antenna 111 may also or alternatively operate in a broadcasting mode in which data is broadcast to different nodes, which may be base stations 230, other vehicles 110, or other nodes.

In particular embodiments, for a particular vehicle 110, it may be desirable for the management system to have available (1) the current location of the vehicle, and (2) the location of each base station installed in the infrastructure of the region. This may allow the vehicle to more quickly establish a communication session with an infrastructure base station, because the radar antenna 111 will not need to perform a broad search (with, e.g., a broadcast signal) prior to establishing the communication session. Determining the location of the vehicle may be accomplished via GPS data and other sensor data that is transmitted via the wireless broadband network. The location of each base station that is installed in the infrastructure may be recorded at the time of installation. The location of the base station may include GPS coordinates and an elevation, or alternatively, may include x, y, z coordinates in a three-dimensional map. In particular embodiments, a management system may generate or otherwise access a high definition three-dimensional map (3D map) of a region. The 3D map may include the location of each base station antenna in the region. The 3D map may also include the location of each base station antenna that is yet to be installed. As an example and not by way of limitation, it may be determined that a base station antenna is to be installed on a particular light pole. The 3D map may already have the precise location (e.g., x, y, z coordinates, GPS location and elevation) of the location on the light pole where the base station antenna will be installed. This information may benefit the management system 960 in at least two ways. First, when a new base station antenna is installed in the region, the management system may already have stored the location for the new base station antenna. This may speed up initialization of the base station antenna because the installer will not need to take a GPS reading at the time of initialization. GPS may provide a rough localization. Additional information, including triangularization, may improve the accuracy of the localization.

This will enable rapid installation and initialization of many base station antennas in any given region. Second, the information may speed up communications between a radar antenna of a vehicle (e.g., an autonomous vehicle) and the base station antenna. As soon as the base station antenna receives a signal from the radar antenna, it may be able to determine the location of the radar antenna relative to its own position based on the azimuth, elevation, and signal strength of incoming signal. The base station antenna may then immediately transmit the radar antenna location to management system. This may enable management system to determine the location of the vehicle associated with the radar antenna.

Additionally, if the vehicle knows the path that it will navigate (e.g., by a navigation system in the vehicle), it may download the locations of each base station antenna along its route. This download may be done over a wireless broadband network (e.g., 4G, LTE). Then, as the vehicle travels along the route, its radar antenna may be able to quickly locate the nearest base station and begin transmitting data to it, without needing to broadcast a handshake signal and locate the nearest base station antenna, even when handshake signals may still be useful. This disclosure contemplates any suitable use cases for faster communication between a radar antenna of a vehicle and base stations. Another benefit of providing base station antennas throughout a region's infrastructure may be that the vehicle or other vehicle equipped with a radar antenna 111 can have a continuous wireless connection through the millimeter wave wireless network via the base station antennas that are installed throughout the region. This may allow a rider of the vehicle to download or stream any type of suitable media, including high-definition video, music, and social media. Another benefit of providing base station antennas throughout a region's infrastructure may be that the base station antennas or radar antennas on the vehicles may act as micro-base stations for cellular service providers. As an example and not by way of limitation, a cellular service provider may send a cell signal to the region for a client device (e.g., a smart phone). The cell signal may be received by the radar antenna 111 or the base station antenna 230. The radar antenna 111 or the base station antenna 230 may then push the signal to the appropriate client device.

Another application for the base stations that are installed throughout a region's infrastructure may be to quantify and analyze foot and vehicular traffic in a given area. As mentioned previously, the base station antennas may include the same components as the radar antennas discussed herein. The base station antennas may emit radar signals into the environment and analyze the return signals to determine objects within the environment. Such a system may be able to count the number of people or cars in a given area. As an example and not by way of limitation, a base station antenna installed at a crosswalk signal may be able to determine how many people are waiting at the crosswalk. It may then be able to communicate to the crosswalk signal whether to change from "don't walk" to "walk." As another example and not by way of limitation, a base station antenna installed above a business may be able to count how many people pass by the business each day. In addition or as an alternative, in particular embodiments, if the base station is configured for substantially real-time wireless-channel estimation or modeling, it may provide an estimate of the traffic conditions and object speed in the base station's environment.

In particular embodiments, a base station antenna may relay information from a first vehicle to a second vehicle. As an example and not by way of limitation, a first radar antenna on a first vehicle may capture information about its surroundings in a first area and transmit that information to a base station antenna. The information may include a list of fifty objects surrounding the first vehicle along with their locations and classifications (e.g., car, pedestrian, utility pole). The base station may then send this information to a second radar antenna of a second vehicle that is approaching the first area. The second vehicle may use this information for object avoidance or for any other suitable use. In particular embodiments, the information may pass between several base station antennas before it is transmitted to the second radar antenna. As an example and not by way of limitation, a first radar antenna may of a first vehicle may be located at a first intersection. The first radar antenna may transmit traffic data to a first base station antenna located at the first intersection. A second vehicle with a second radar antenna may be traveling along a route that includes the first intersection. The first base station antenna may transmit the data to a second base station antenna. The second base station antenna may then transmit the data to the second radar antenna, so that by the time that the second vehicle reaches the first intersection, the navigation system associated with the second vehicle has information about the traffic in and around the first intersection.

Figure 8:
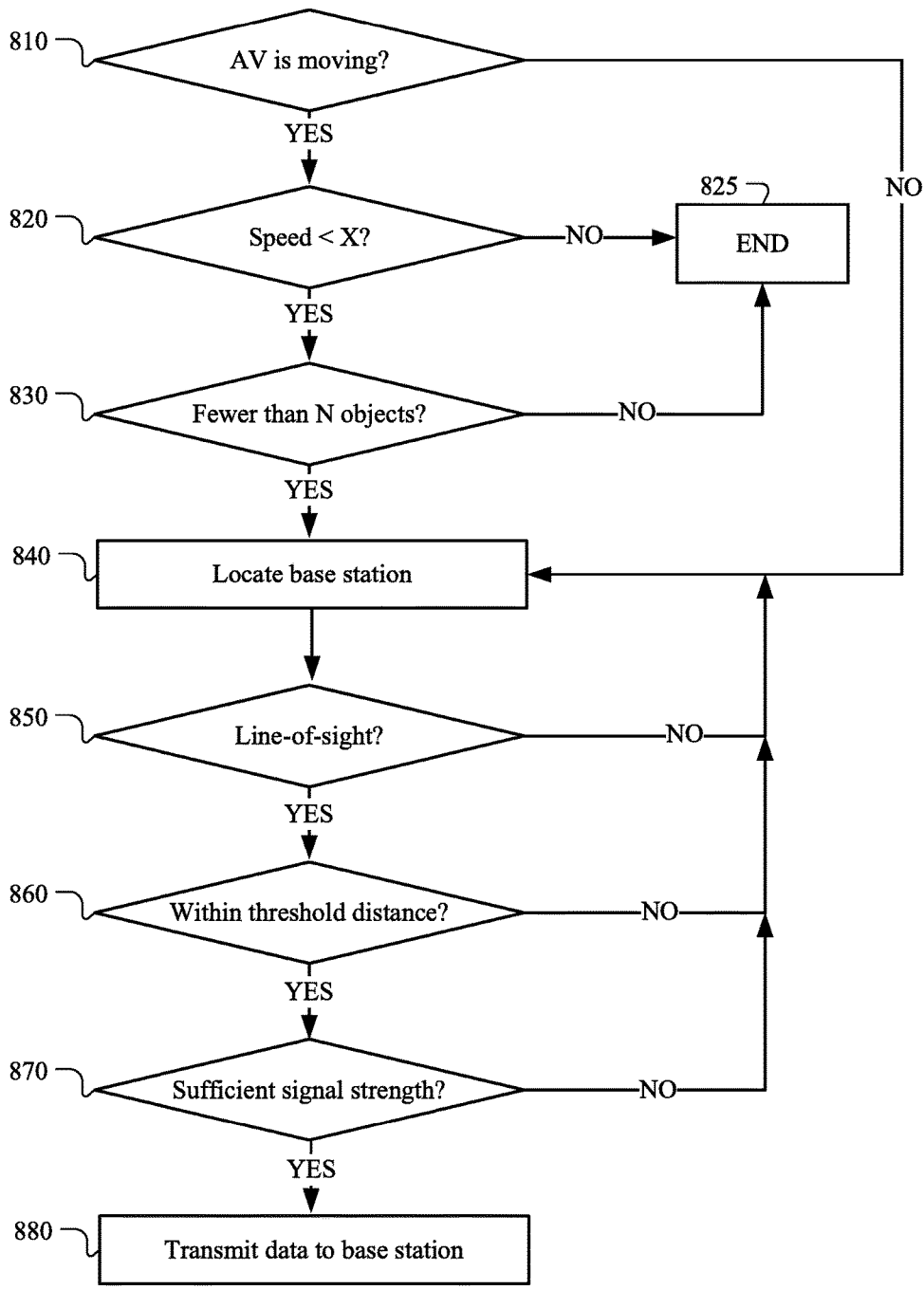
FIG. 8 illustrates an example method for determining when to switch between object detection and data transfer for an example radar antenna.

FIG. 8 illustrates an example method 800 for determining when to switch between object detection and data transfer for an example radar antenna. Depending on the operational status of the autonomous vehicle and the number of objects surrounding it, the radar antenna 111 may be able to switch from object detection mode to data transmission mode. The vehicle 110 may travel in many different types of environments at many different times of the day or night. There may be lots of objects surrounding the vehicle, such as pedestrians, other vehicles, cyclists, buildings, and the like. In these situations, it may be too dangerous to use radar resources to transfer data because all the radar antenna signaling may need to be devoted to detecting objects so the vehicle avoids collisions. In other cases, there may be relatively few objects surrounding the autonomous vehicle and it may be safe to divert some signaling for data transmission. Method 800 may begin at step 810, where a computing device associated with the radar antenna (e.g., communication module 311) accesses the operation status of the vehicle. The operational status of the vehicle may be a simple binary distinction of whether the vehicle is moving or not. In particular embodiments, the operation status may be more nuanced—it may be a classification of one of several different driving modes of the vehicle, including "parked," "autonomously driving," "human driver," or any other suitable driving mode. As a simple case, at step 810, the computing device determines whether the vehicle is moving. If the vehicle is moving, the method may proceed to step 820. If the vehicle is not moving, the method may proceed to step 840, which will be discussed below. In particular embodiments, step 810 may include a determination of whether the vehicle is in "autonomous driving" mode or "human driver" mode. If it is in human driver mode, the method may proceed to step 820.

At step 820, the computing device may determine whether the speed of the vehicle is less than a threshold speed X. In particular embodiments, the operational status may include the speed at which the vehicle is driving. This determination may be necessary because if the vehicle is travelling above a threshold speed (e.g., 25 miles per hour) it may be necessary to reserve all of the radar antenna's signaling for object detection. It would simply not be worth the risk to divert some antenna resources away from object detection if there is a chance the vehicle might collide into an object. But at low speeds, the chance of collision is lower. Thus, it may be safe to divert some signaling resources to data transmission if the vehicle is driving below a threshold speed. Note that even if the radar antenna 111 is in data transmission mode, vehicle 110 has other sensors that will be fully devoted to doing object detection all the time, such a LIDAR sensing array, which may be installed on vehicle 110. If the speed of the vehicle is less than a threshold speed, the method may proceed to step 830. If the speed of the vehicle is greater than the threshold speed, the method may proceed to step 825, where the computing device may determine not to switch out of object detection mode.

At step 830, the computing device accesses sensor data of one or more sensors of the vehicle. The sensor data may contain a count of an a location of a plurality of objects within a threshold distance of the vehicle. Step 830 may include determining whether there are fewer than a threshold number of objects within a threshold distance of the vehicle 110. This determination may be made for similar reasons to the determination of step 820. If there are lots of objects surrounding the vehicle 110, radar antenna 111 may need to devote all of its signaling to detecting those objects. This may be the case during the daytime in urban areas, during rush hour traffic, or any time lots of pedestrians and cars are on the road. However, if the environment has relatively few objects around the vehicle, the chance of colliding with an object may be lower. Thus, it may be safe to divert some signaling resources to data transmission if there are fewer than N objects surrounding the vehicle. If there are more than N objects, the method may proceed to step 825, where the computing device may determine not to switch out of object detection mode. If there are fewer than N objects, the method may proceed to step 840, where the computing device sends instructions to radar antenna 111 to locate a base station. Locating a base station may be accomplished by the radar antenna broadcasting a handshake signal into the environment. If there is a base station antenna nearby, the base station antenna may receive that handshake signal and transmit an acknowledgement signal back to the radar antenna. The computing device may receive this acknowledgement signal and proceed to step 850. Note that at step 840, the radar antenna may be deemed to have switched to data transmission mode.

Steps 850, 860, and 870 ensure that the quality of the communication link between the radar antenna and the base station antenna is high enough for data offload. At step 850, the computing device may determine whether a line-of-sight exists between the radar antenna 111 and the base station antenna 230. This is because on a wireless millimeter-wave communication network, a line-of-sight between network nodes (e.g., base station antennas and radar antennas) may be necessary. This may be due to the nature of millimeter wave networks. At step 860, the computing device may determine whether the base station antenna is within a threshold distance of the base station antenna. Due to the nature of a wireless millimeter-wave communication network, the distance between network nodes may need to be relatively small (e.g., 50-150 meters) in order for effective data transmission to occur. At step 870, the computing device determines whether the signal strength between the radar antenna and the base station antenna signal is sufficient. This may be measured using any suitable signal strength measuring technique. If the answers to each of steps 850, 860, and 870 are yes, the method may proceed to step 880, and the data transfer may begin. If any of the answers to steps 850, 860, and 870 are no, this may mean that the quality of the connection between the radar antenna and the base station antenna is too low, and the method may proceed to step 855, where the computing device may determine to repeat step 840 and look for a new base station. Note that steps 810, 820, and 830 may be repeated continuously throughout the data transfer process and the decision-making process to switch to data transmission mode. In other words, the computing device may continue to monitor the status and speed of the vehicle and to monitor the number of objects surrounding the vehicle. If at any time any of the answers to steps 810-830 are no, the method may immediately proceed to step 825 and all signaling resources may be saved for object detection.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for determining when to switch between object detection and data transfer for an example radar antenna including the particular steps of the method of FIG. 8, this disclosure contemplates any suitable method for determining when to switch between object detection and data transfer for an example radar antenna including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
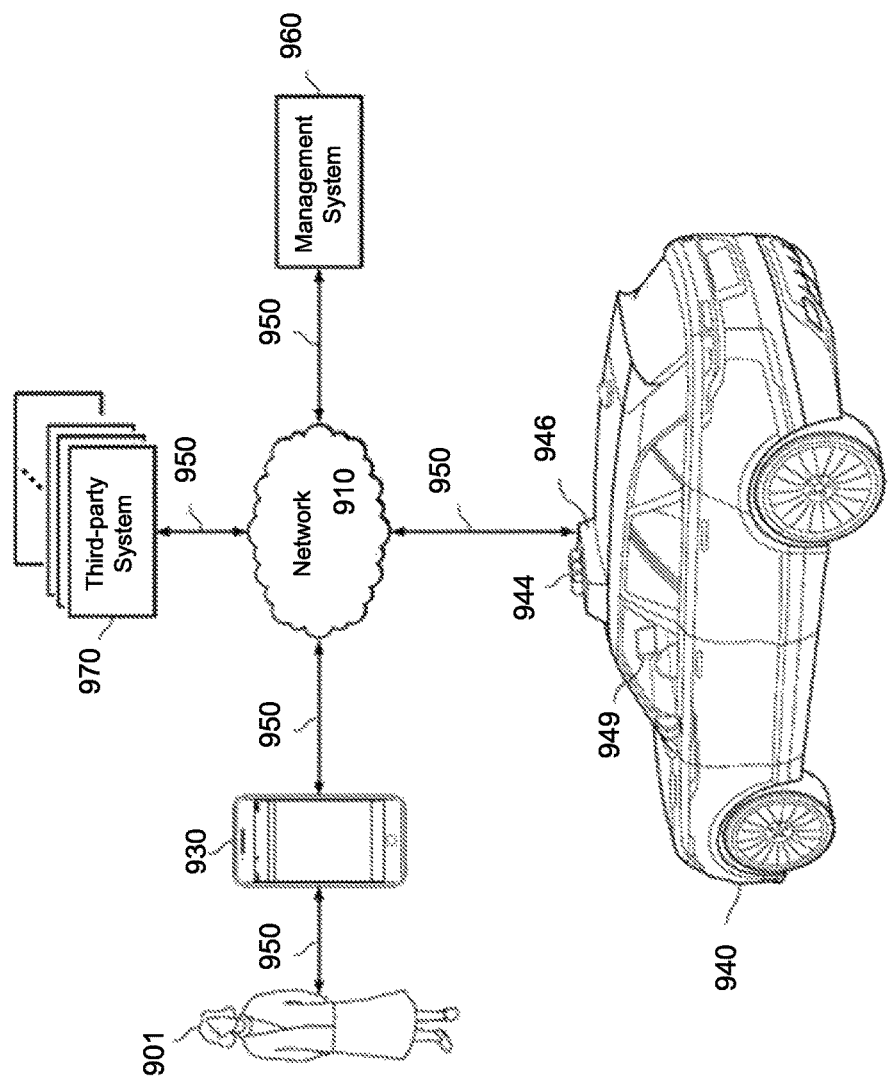
FIG. 9 illustrates an example transportation management environment for matching ride requestors with autonomous vehicles.

FIG. 9 illustrates an example transportation management environment for matching ride requestors with autonomous vehicles. In particular embodiments, the environment may include various computing entities, such as a user computing device 930 of a user 901 (e.g., a ride provider or requestor), a transportation management system 960, an autonomous vehicle 940, and one or more third-party system 970. Autonomous vehicle 940 may be connected to the infrastructure network of FIG. 6, and the infrastructure network of FIG. 6 may be connected to network 910 by means of links 950. The computing entities may be communicatively connected over any suitable network 910. As an example and not by way of limitation, one or more portions of network 910 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 9 illustrates a single user device 930, a single transportation management system 960, a single vehicle 940, a plurality of third-party systems 970, and a single network 910, this disclosure contemplates any suitable number of each of these entities. As an example and not by way of limitation, the network environment may include multiple users 901, user devices 930, transportation management systems 960, autonomous vehicles 940, third-party systems 970, and networks 910.

The user device 930, transportation management system 960, autonomous vehicle 940, and third-party system 970 may be communicatively connected or co-located with each other in whole or in part. These computing entities may communicate via different transmission technologies and network types. For example, the user device 930 and the vehicle 940 may communicate with each other via a cable or short-range wireless communication (e.g., Bluetooth, NFC, WI-FI, etc.), and together they may be connected to the Internet via a cellular network that is accessible to either one of the devices (e.g., the user device 930 may be a smartphone with LTE connection). The transportation management system 960 and third-party system 970, on the other hand, may be connected to the Internet via their respective LAN/WLAN networks and Internet Service Providers (ISP). FIG. 9 illustrates transmission links 950 that connect user device 930, autonomous vehicle 940, transportation management system 960, and third-party system 970 to communication network 910. This disclosure contemplates any suitable transmission links 950, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 950 may connect to one or more networks 910, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 950. For example, the user device 930 may communicate with the transportation management system via a cellular network and the Internet, but communicate with the autonomous vehicle 940 via Bluetooth or a physical wire connection.

In particular embodiments, the transportation management system 960 may fulfill ride requests for one or more users 901 by dispatching suitable vehicles. The transportation management system 960 may receive any number of ride requests from any number of ride requestors 901. In particular embodiments, a ride request from a ride requestor 901 may include an identifier that identifies the ride requestor in the system 960. The transportation management system 960 may use the identifier to access and store the ride requestor's 901 information, in accordance with the requestor's 901 privacy settings. The ride requestor's 901 information may be stored in one or more data stores (e.g., a relational database system) associated with and accessible to the transportation management system 960. In particular embodiments, ride requestor information may include profile information about a particular ride requestor 901. In particular embodiments, the ride requestor 901 may be associated with one or more categories or types, through which the ride requestor 901 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 960 may classify a user 901 based on known information about the user 901 (e.g., using machine-learning classifiers), and use the classification to retrieve relevant aggregate information associated with that class. For example, the system 960 may classify a user 901 as a young adult and retrieve relevant aggregate information associated with young adults, such as the type of music generally preferred by young adults.

Transportation management system 960 may also store and access ride information. Ride information may include locations related to the ride, traffic data, route options, optimal pick-up or drop-off locations for the ride, or any other suitable information associated with a ride. As an example and not by way of limitation, when the transportation management system 960 receives a request to travel from San Francisco International Airport (SFO) to Palo Alto, Calif., the system 960 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 960. For example, historical data may include aggregate information generated based on past ride information, which may include any ride information described herein and telemetry data collected by sensors in autonomous vehicles or user devices. Historical data may be associated with a particular user (e.g., that particular user's preferences, common routes, etc.), a category/class of users (e.g., based on demographics), or all users of the system 960. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 960 in particular embodiments may predict and provide ride suggestions in response to a ride request. In particular embodiments, the system 960 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, or semi-supervised learning based on a mixture of labeled and unlabeled training data.

In particular embodiments, transportation management system 960 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 960 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 930 (which may belong to a ride requestor or provider), a transportation management system 960, autonomous vehicle 940, or a third-party system 970 to process, transform, manage, retrieve, modify, add, or delete the information stored in the data store.

In particular embodiments, transportation management system 960 may include an authorization server (or any other suitable component(s)) that allows users 901 to opt-in to or opt-out of having their information and actions logged, recorded, or sensed by transportation management system 960 or shared with other systems (e.g., third-party systems 970). In particular embodiments, a user 901 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 901 of transportation management system 960 through blocking, data hashing, anonymization, or other suitable techniques as appropriate.

In particular embodiments, third-party system 970 may be a network-addressable computing system that may provide HD maps or host GPS maps, customer reviews, music or content, weather information, or any other suitable type of information. Third-party system 970 may generate, store, receive, and send relevant data, such as, for example, map data, customer review data from a customer review website, weather data, or any other suitable type of data. Third-party system 970 may be accessed by the other computing entities of the network environment either directly or via network 910. For example, user device 930 may access the third-party system 970 via network 910, or via transportation management system 960. In the latter case, if credentials are required to access the third-party system 970, the user 901 may provide such information to the transportation management system 960, which may serve as a proxy for accessing content from the third-party system 970.

In particular embodiments, user device 930 may be a mobile computing device such as a smartphone, tablet computer, or laptop computer. User device 930 may include one or more processors (e.g., CPU or GPU), memory, and storage. An operating system and applications may be installed on the user device 930, such as, e.g., a transportation application associated with the transportation management system 960, applications associated with third-party systems 970, and applications associated with the operating system. User device 930 may include functionality for determining its location, direction, or orientation, based on integrated sensors such as GPS, compass, gyroscope, or accelerometer. User device 930 may also include wireless transceivers for wireless communication and may support wireless communication protocols such as Bluetooth, near-field communication (NFC), infrared (IR) communication, WI-FI, or 2G/3G/4G/LTE mobile communication standard. User device 930 may also include one or more cameras, scanners, touchscreens, microphones, speakers, and any other suitable input-output devices.

In particular embodiments, the autonomous vehicle 940 may be and equipped with an array of sensors 944, a navigation system 946, and a ride-service computing device 948. In particular embodiments, a fleet of autonomous vehicles 940 may be managed by the transportation management system 960. The fleet of autonomous vehicles 940, in whole or in part, may be owned by the entity associated with the transportation management system 960, or they may be owned by a third-party entity relative to the transportation management system 960. In either case, the transportation management system 960 may control the operations of the autonomous vehicles 940, including, e.g., dispatching select vehicles 940 to fulfill ride requests, instructing the vehicles 940 to perform select operations (e.g., head to a service center or charging/fueling station, pull over, stop immediately, self-diagnose, lock/unlock compartments, change music station, change temperature, and any other suitable operations), and instructing the vehicles 940 to enter select operation modes (e.g., operate normally, drive at a reduced speed, drive under the command of human operators, and any other suitable operational modes).

In particular embodiments, the autonomous vehicles 940 may receive data from and transmit data to the transportation management system 960 and the third-party system 970. Examples of received data may include, e.g., instructions, new software or software updates, maps, 3D models, trained or untrained machine-learning models, location information (e.g., location of the ride requestor, the autonomous vehicle 940 itself, other autonomous vehicles 940, and target destinations such as service centers), navigation information, traffic information, weather information, entertainment content (e.g., music, video, and news) ride requestor information, ride information, and any other suitable information. Examples of data transmitted from the autonomous vehicle 940 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 940, passengers may send/receive data to the transportation management system 960 or third-party system 970), and any other suitable data.

In particular embodiments, autonomous vehicles 940 may also communicate with each other as well as other traditional human-driven vehicles, including those managed and not managed by the transportation management system 960. For example, one vehicle 940 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 960 or third-party system 970).

In particular embodiments, an autonomous vehicle 940 may obtain and process sensor/telemetry data. Such data may be captured by any suitable sensors. For example, the vehicle 940 may have a Light Detection and Ranging (LiDAR) sensor array of multiple LiDAR transceivers that are configured to rotate 360°, emitting pulsed laser light and measuring the reflected light from objects surrounding vehicle 940. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 940. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 940 may have optical cameras pointing in different directions. The cameras may be used for, e.g., recognizing roads, lane markings, street signs, traffic lights, police, other vehicles, and any other visible objects of interest. To enable the vehicle 940 to "see" at night, infrared cameras may be installed. In particular embodiments, the vehicle may be equipped with stereo vision for, e.g., spotting hazards such as pedestrians or tree branches on the road. As another example, the vehicle 940 may have radars for, e.g., detecting other vehicles or hazards afar. Furthermore, the vehicle 940 may have ultrasound equipment for, e.g., parking and obstacle detection. In addition to sensors enabling the vehicle 940 to detect, measure, and understand the external world around it, the vehicle 940 may further be equipped with sensors for detecting and self-diagnosing the vehicle's own state and condition. For example, the vehicle 940 may have wheel sensors for, e.g., measuring velocity; global positioning system (GPS) for, e.g., determining the vehicle's current geolocation; or inertial measurement units, accelerometers, gyroscopes, or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 940 may build a 3D model of its surrounding based on data from its LiDAR, radar, sonar, and cameras, along with a pre-generated map obtained from the transportation management system 960 or the third-party system 970. Although sensors 944 appear in a particular location on autonomous vehicle 940 in FIG. 9, sensors 944 may be located in any suitable location in or on autonomous vehicle 940. Example locations for sensors include the front and rear bumpers, the doors, the front windshield, on the side panel, or any other suitable location. In particular embodiments, sensors 944 include radar antenna 111.

In particular embodiments, the autonomous vehicle 940 may be equipped with a processing unit (e.g., one or more CPUs and GPUs), memory, and storage. The vehicle 940 may thus be equipped to perform a variety of computational and processing tasks, including processing the sensor data, extracting useful information, and operating accordingly. For example, based on images captured by its cameras and a machine-vision model, the vehicle 940 may identify particular types of objects captured by the images, such as pedestrians, other vehicles, lanes, curbs, and any other objects of interest.

In particular embodiments, the autonomous vehicle 940 may have a navigation system 946 responsible for safely navigating the autonomous vehicle 940. In particular embodiments, the navigation system 946 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 946 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 946 may use its determinations to control the vehicle 940 to operate in prescribed manners and to guide the autonomous vehicle 940 to its destinations without colliding into other objects. Although the physical embodiment of the navigation system 946 (e.g., the processing unit) appears in a particular location on autonomous vehicle 940 in FIG. 9, navigation system 946 may be located in any suitable location in or on autonomous vehicle 940. Example locations for navigation system 946 include inside the cabin or passenger compartment of autonomous vehicle 940, near the engine/battery, near the front seats, rear seats, or in any other suitable location.

In particular embodiments, the autonomous vehicle 940 may be equipped with a ride-service computing device 948, which may be a tablet or any other suitable device installed by transportation management system 960 to allow the user to interact with the autonomous vehicle 940, transportation management system 960, other users 901, or third-party systems 970. In particular embodiments, installation of ride-service computing device 948 may be accomplished by placing the ride-service computing device 948 inside autonomous vehicle 940, and configuring it to communicate with the vehicle 940 via a wire or wireless connection (e.g., via Bluetooth). Although FIG. 9 illustrates a single ride-service computing device 948 at a particular location in autonomous vehicle 940, autonomous vehicle 940 may include several ride-service computing devices 948 in several different locations within the vehicle. As an example and not by way of limitation, autonomous vehicle 940 may include four ride-service computing devices 948 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 948 may be detachable from any component of autonomous vehicle 940. This may allow users to handle ride-service computing device 948 in a manner consistent with other tablet computing devices. As an example and not by way of limitation, a user may move ride-service computing device 948 to any location in the cabin or passenger compartment of autonomous vehicle 940, may hold ride-service computing device 948, or handle ride-service computing device 948 in any other suitable manner. Although this disclosure describes providing a particular computing device in a particular manner, this disclosure contemplates providing any suitable computing device in any suitable manner.

Figure 10:
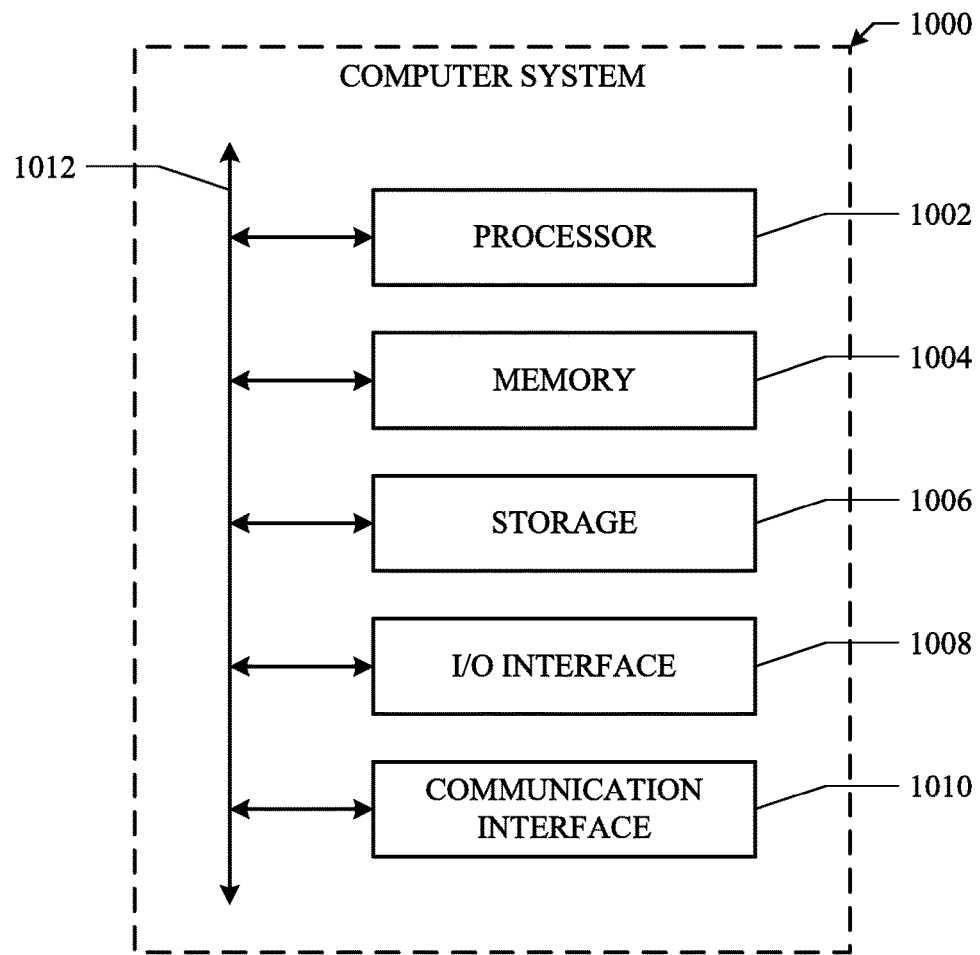
FIG. 10 illustrates an example computing system.

FIG. 10 illustrates an example computer system 1000. In particular embodiments, one or more computer systems 1000 perform one or more steps of one or more methods described or illustrated herein. In particular embodiments, one or more computer systems 1000 provide the functionalities described or illustrated herein. In particular embodiments, software running on one or more computer systems 1000 performs one or more steps of one or more methods described or illustrated herein or provides the functionalities described or illustrated herein. Particular embodiments include one or more portions of one or more computer systems 1000. Herein, a reference to a computer system may encompass a computing device, and vice versa, where appropriate. Moreover, a reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 that are to be operated on by computer instructions; the results of previous instructions executed by processor 1002 that are accessible to subsequent instructions or for writing to memory 1004 or storage 1006; or any other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs), be a multi-core processor, or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described in further detail below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising, by a computing system:
accessing an operational status of a vehicle, a radar antenna array being coupled to the vehicle;
accessing sensor data to determine a count of a plurality of objects within a vicinity of the vehicle and a location of the plurality of objects within the vicinity of the vehicle;
accessing signal strength data associated with one or more base stations located within the vicinity of the vehicle, the signal strength data indicating a strength of a communication signal between the radar antenna array and the one or more base stations;
determining to switch at least one radar resource of the radar antenna array from an object detection mode to a data transfer mode, wherein the determination is based on at least one of the operational status, the sensor data, or the signal strength data, and
causing the at least one radar resource of the radar antenna array to switch from the object detection mode to the data transfer mode.

2. The method of claim 1, further comprising providing instructions to transfer vehicle data associated with the vehicle to the one or more base stations.

3. The method of claim 2, further comprising providing prioritization instructions for transferring the vehicle data, wherein the prioritization instructions comprise instructions to transfer data associated with vehicle diagnostics before sensor data.

4. The method of claim 1, further comprising providing instructions to maintain the at least one radar resource in an object detection mode during a transfer of vehicle data.

5. The method of claim 1, wherein the at least one or more antennas of the one or more base stations is located on a second vehicle.

6. The method of claim 1, wherein the determining to switch the at least one radar resource from the object detection mode to the data transfer mode is made based on a determination that the count of objects within the vicinity of the vehicle is below a threshold number.

7. The method of claim 1, wherein the determining to switch the at least one radar resource from the object detection mode to the data transfer mode is made based on a determination that the signal strength data indicates that the strength of the communication signal is above a threshold signal strength.

8. The method of claim 1, wherein the determining to switch the at least one radar resource from the object detection mode to the data transfer mode is made based on a determination that the operational status of the vehicle indicates that the vehicle is driving below a threshold speed.

9. The method of claim 1, further comprising:
determining that the count of objects within the vicinity of the vehicle is above a threshold number; and
determining to switch the at least one radar resource back to the object detection mode.

10. The method of claim 1, wherein the at least one radar resource is:
a radar antenna; or
a radio-frequency front end of the vehicle.

11. The method of claim 1, wherein the vehicle is an autonomous vehicle.

12. A system comprising:
one or more processors; and
one or more computer-readable non-transitory storage media coupled to one or more of the processors and comprising instructions operable when executed by one or more of the processors to cause the system to:
access an operational status of a vehicle, wherein a radar antenna array is coupled to the vehicle;
access sensor data that comprises a count of and a location of a plurality of objects within a vicinity of the vehicle;
access signal strength data associated with one or more base stations located within the vicinity of the vehicle, the signal strength data indicating a strength of a communication signal between the radar antenna array and the one or more base stations;

determine to switch at least one radar resource of the radar antenna array from an object detection mode to a data transfer mode, wherein the determination is based on at least one of the operational status, the sensor data, or the signal strength data, and cause the at least one radar resource of the radar antenna array to switch from the object detection mode to the data transfer mode.

13. The system of claim 12, wherein the instructions are further operable when executed by one or more of the processors to cause the system to provide instructions to transfer vehicle data associated with the vehicle to the one or more base stations.

14. The system of claim 13, wherein the instructions are further operable when executed by one or more of the processors to cause the system to provide prioritization instructions for transferring the vehicle data, wherein the prioritization instructions comprise instructions to transfer data associated with vehicle diagnostics before sensor data.

15. The system of claim 12, wherein the instructions are further operable when executed by one or more of the processors to cause the system to provide instructions to maintain the at least one radar resource in an object detection mode during a transfer of vehicle data.

16. The system of claim 12, wherein at least one or more antennas of the one or more base stations is located on a second vehicle.

17. The system of claim 12, wherein the determining to switch the at least one radar resource from the object detection mode to the data transfer mode is made based on a determination that the count of objects within the vicinity of the vehicle is below a threshold number.

18. The system of claim 12, wherein the determining to switch the at least one radar resource from the object detection mode to the data transfer mode is made based on a determination that the signal strength data indicates that the strength of the communication signal is above a threshold signal strength.

19. The system of claim 12, wherein the determining to switch the at least one radar resource from the object detection mode to the data transfer mode is made based on a determination that the operational status of the vehicle indicates that the vehicle is driving below a threshold speed.

20. The system of claim 12, wherein the instructions are further operable when executed by one or more of the processors to cause the system to:
determine that the count of objects within the vicinity of the vehicle is above a threshold number; and
determine to switch the at least one radar resource back to the object detection mode.

21. The system of claim 12, wherein one or more of the plurality of radar resources are:
radar antennas; or
a radio-frequency front end of the vehicle.

22. The system of claim 12, wherein the vehicle is an autonomous vehicle.

23. One or more computer-readable non-transitory storage media embodying software that is operable when executed to:
access an operational status of a vehicle, wherein a radar antenna array is coupled to the vehicle;
access sensor data that comprises a count of and a location of a plurality of objects within a vicinity of the vehicle;
access signal strength data associated with one or more base stations located within the vicinity of the vehicle, the signal strength data indicating a strength of a communication signal between the radar antenna array and the one or more base stations;
determine to switch at least one radar resource of the radar antenna array from an object detection mode to a data transfer mode, wherein the determination is based on at least one of the operational status, the sensor data, or the signal strength data, and
causing the at least one radar resource of the radar antenna array to switch from the object detection mode to the data transfer mode.

24. The media of claim 23, wherein the software is further operable when executed to provide instructions to transfer vehicle data associated with the vehicle to the one or more base stations.

25. The media of claim 24, wherein the software is further operable when executed to provide prioritization instructions for transferring the vehicle data, wherein the prioritization instructions comprise instructions to transfer data associated with vehicle diagnostics before sensor data.

26. The media of claim 23, wherein the software is further operable when executed to provide instructions to maintain the at least one radar resource in an object detection mode during a transfer of vehicle data.

27. The media of claim 23, wherein at least one or more antennas of the one or more base stations is located on a second vehicle.

28. The media of claim 23, wherein the determining to switch the at least one radar resource from the object detection mode to the data transfer mode is made based on a determination that the count of objects within the vicinity of the vehicle is below a threshold number.

29. The media of claim 23, wherein the determining to switch the at least one radar resource from the object detection mode to the data transfer mode is made based on a determination that the signal strength data indicates that the strength of the communication signal is above a threshold signal strength.

30. The media of claim 23, wherein the determining to switch the at least one radar resource from the object detection mode to the data transfer mode is made based on a determination that the operational status of the vehicle indicates that the vehicle is driving below a threshold speed.

31. The media of claim 23, wherein the software is further operable when executed to:
determine that the count of objects within the vicinity of the vehicle is above a threshold number; and
determine to switch the at least one radar resource back to the object detection mode.

32. The media of claim 23, wherein the at least one radar resource is:
a radar antenna; or
a radio-frequency front end of the vehicle.

33. The media of claim 23, wherein the vehicle is an autonomous vehicle.

* * * * *